Figure 1:
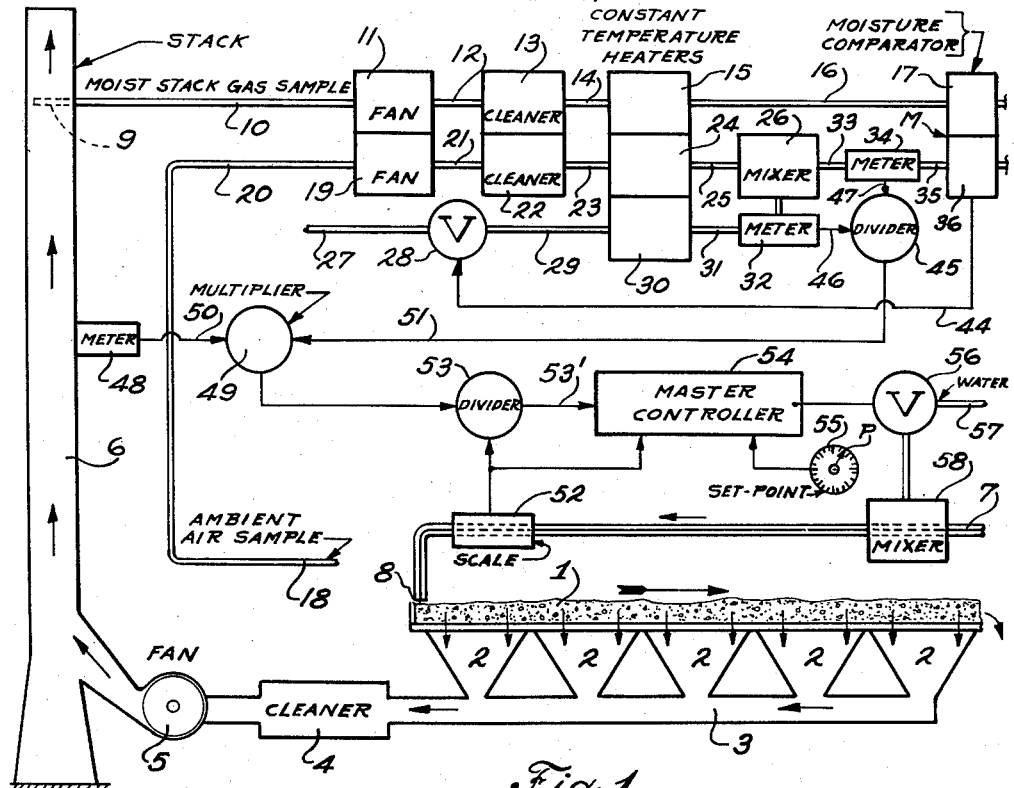

April 5, 1960

M. J. GREAVES 2,931,718

METHOD AND APPARATUS FOR AUTOMATICALLY
MEASURING AND CONTROLLING MOISTURE
IN A SINTER MIX OR THE LIKE

Filed Jan. 15, 1958

INVENTOR.
MELVIN J. GREAVES

BY Bosworth, Sessions,
Herrstrom & Knowles

ATTORNEYS

United States Patent Office 2,931,718
Patented Apr. 5, 1960

2,931,718

METHOD AND APPARATUS FOR AUTOMATICALLY MEASURING AND CONTROLLING MOISTURE IN A SINTER MIX OR THE LIKE

Melvin J. Greaves, Parma, Ohio, assignor to Arthur G. McKee & Company, Cleveland, Ohio, a corporation of Delaware Application January 15, 1958, Serial No. 709,061

13 Claims. (Cl. 75—5)

This invention relates to sintering or other heat treating operations on metallic ores, ore concentrates, blast furnace flue dust, etc., and more particularly to a method of and apparatus for automatically and continuously measuring and/or controlling the moisture content of sinter mix that is supplied to a continuous sintering machine.

In an extensively used type of continuous machine for the sintering of iron ore, blast furnace flue dust, etc., and for the heat treating of pellets of concentrated ores or the like, a series of pallets, each having its bottom in the form of a pervious grate, are moved in abutting relation along a pair of tracks. The pallets are mounted on suitable wheels, and the tracks are ordinarily in the form of a continuous loop whereby the pallets are returned to the charging end of the machine and reloaded so that the machine operates in a continuous manner. Windboxes are provided below the portion of the tracks on which the sintering operation takes place in order to provide the desired draft through the material in the pallets. The charge or sinter mix includes the material to be sintered together with such fuel as is necessary, and the mix normally also contains a certain amount of moisture.

It has been demonstrated that the amount of moisture in a sinter mix has a significant influence on the maximum rate of production that can be achieved in any particular set-up. It has also been suggested that the amount of moisture in the mix has an effect on the quality of the sinter product. Furthermore, control of the amount of moisture in the sinter mix is desirable to permit uniform operation.

At the present time moisture determinations are made in the laboratory on samples taken from the material mix that is being charged onto the pallets. However, with this procedure, measurement of variations in the moisture content of the mix as it comes to the sintering machine cannot be made rapidly enough to permit fully effective adjustment of the moisture content to the desired value by increasing or decreasing the amount of water added to the mix. Various attempts have been made to continuously monitor a variable which is related to moisture, and, by means of proper calibrations, to convert these measurements to a measurement of moisture. Among the various schemes that have been tried are electrical probes which measure the conductivity of the mix on a moving conveyor belt. With this system it has been possible to measure the conductivity, but it has not been possible properly to interpret and use this information to measure and/or maintain a desired moisture content in the mix supplied to the sintering machine because the measured variable (the conductivity of the mix) does not bear a fixed relation to the amount of moisture present in the mix. Thus the conductivity of the mix is influenced not only by the moisture content but also by the chemical constituents of the mix, the bulk density and texture of the mix, the condition of the probes, etc., and the resulting readings are not sufficiently accurate to form the basis for a satisfactory moisture control system.

Accordingly it is among the objects of the present invention to provide an accurate and effective method of and apparatus for automatically and continuously measuring the amount or content of moisture in the mix as it comes to a sintering machine or the like and, if desired, to employ variations in this moisture content measurement to control the rate of moisture that is added to the sinter mix to maintain it at a desired predetermined value or set-point. Further objects of my invention include the provision of means for measuring the moisture in a sinter mix or the like which means are independent of the other chemical constituents and physical condition of the mix and are responsive substantially instantaneously to variations in the moisture content of the mix as it is delivered to the machine; the provision of a method of moisture control which will automatically and continuously regulate the amount of moisture added to a moving stream of material to maintain the moisture content of the material at the desired value; and the provision of a control system which will permit the operator of a sintering machine or the like to select a desired moisture content for the mix and, by adjusting the set-point of the control apparatus to the desired value, maintain this moisture content automatically and without further attention.

Figure 2:
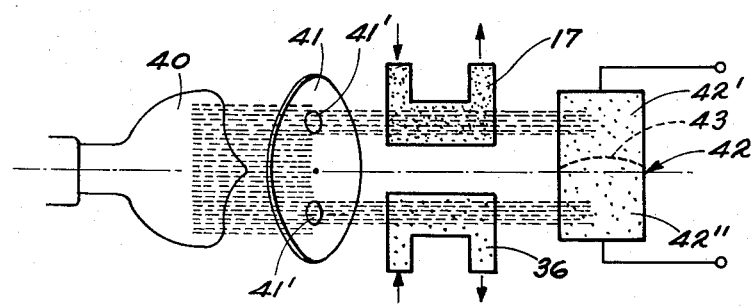

The above and other objects of my invention will appear from the following description of one form of apparatus for carrying out my improved method, reference being had to the accompanying drawings in which:

Figure 1 is a flow sheet diagrammatically illustrating my automatic moisture control as applied to an iron ore sintering machine; and Figure 2 is a diagrammatic illustration of a moisture comparator adapted to be used in my improved moisture control system.

To effect automatic and continuous measurement of the moisture content of a sinter mix or the like I propose to measure the moisture in the stack gases (products of combustion, excess air, water vapor, etc.,) from the sintering machine, the moisture in the ambient air, the quantity of the stack gases, the total rate of feed of mix to the machine, and, if desired in some cases, the rate of feed and chemical analysis of fuels which contain hydrogen and are used in the sintering operation. By measuring the items referred to above and properly correlating these measurements, I am able automatically and continuously to determine the amount of moisture in the sinter mix and, by comparing this quantity to a desired value or set-point, to regulate the amount of moisture added to the mix in a manner to maintain the moisture content substantially at the set-point.

My procedure contemplates, in effect, determining the amount of moisture present in the mix being sintered by measuring the total amount of moisture in the stack gases and subtracting therefrom the total of the amount of moisture in the stack gases from sources other than the mix, i.e., the combustion, excess, and leakage air which passes to and through the sinter bed plus, if desired, the amount of moisture produced during combustion by the hydrogen in the fuel in the sinter mix. This combustion moisture is, however, usually of such relatively small quantity that it need not be taken into account and it is not further referred to herein. These data are fed into suitable computer means which calculate the amount of moisture evaporated from the mix. The computer means, through suitable auxiliary controls, further regulate the amount of water added to the mix so that the desired moisture content is continuously and automatically maintained in the mix. The apparatus illustrated in the drawings and described below is adapted to carry out my improved moisture measuring and control procedure, but other measuring and control means, such as are referred to later herein, could be employed if desired.

In Figure 1 the traveling bed of material or sinter mix on a conventional continuous sintering machine is indicated at 1, movement being in the direction of the arrow. Windboxes 2 are disposed below the traveling bed 1 and discharge into a common header 3 leading through a dust catcher or cleaner 4 to a fan 5 which draws air through the sinter bed 1 downwardly into the windboxes 2, through the header 3 and cleaner 4 and discharges into the stack 6. The sinter mix is fed to the apparatus on a diagrammatically indicated conveyor 7 which ultimately charges the mix at 8 onto the moving pallets which carry the sinter bed 1 in well known manner.

During operating of the sintering machine, the mix burns as it moves along the sinter bed 1, and the gases that are discharged through the stack 6 are made up of products of combustion, excess air, moisture in the form of water vapor from the air and from the mix, etc. Samples of the moist stack gases are continuously collected in a sample tube 9 in the stack 6 and are withdrawn through a tube 10 by a fan 11. These gases are carried by a tube 12 to a cleaner 13 for removal of dust or other solids and through a tube 14 to a constant temperature heater 15 where they are raised to a predetermined steady temperature. Tube 16 then carries the constant temperature gas to the sample cell 17 of a moisture comparator generally indicated at M and more fully described later.

Samples of ambient air are collected at a point indicated at 18, preferably near the sintering machine, and are moved by a fan 19 through the tubes 20 and 21 to the cleaner 22. Tube 23 conveys the ambient air sample to the constant temperature heater 24 where the temperature is raised to the same predetermined steady value as the stack gas sample in heater 15. The constant temperature ambient air sample then moves through tube 25 to the mixer 26.

Steam for any suitable source is supplied through a pipe 27 to the steam control valve 28, passes through pipe 29 to the constant temperature heater 30 where it is heated to the same predetermined steady temperature value as the ambient air and stack gas samples previously referred to. The constant temperature steam then moves through pipe 31 through a steam flow meter 32, which may be of any suitable and well-known type, to the mixer 26 where it is mixed with the ambient air sample.

The resulting air-steam mixture passes through tube 33 to a flow meter 34 and thence through tube 35 to the reference cell 36 of the moisture comparator M.

A suitable type of moisture comparator is diagrammatically illustrated in Figure 2 and operates on the principle that heteroatomic gases absorb infrared energy of various discreet characteristic wave lengths. This absorption increases the temperature, and hence the pressure, of a fixed volume of gas proportional to the amount of energy absorption. The moisture comparator illustrated in Figure 2 includes an infrared source 40, such as an incandescent lamp or the like, a motor driven rotating beam chopper in the form of a disk 41 having a pair of opposite apertures 41' therein, the sample cell 17, which has been previously referred to and which receives the stack gas sample, and a reference cell 36, also previously referred to and which receives the steam-air mixture. As indicated by the arrows in Figure 2, the stack gas sample and the steam-air mixture pass into, through and out of the sample cell 17 and reference cell 36 respectively. The detector element 42 of the moisture comparator M is divided into two chambers 42' and 42" by a diaphragm 43. The detector element is sensitized by filling both chambers to the same pressure with water vapor. When infrared energy falls on the detector chambers the energy will be absorbed only in that region of the spectrum where the water vapor has bands.

Thus the moisture comparator M remains in balance unless a different amount of water vapor is present in the stack gas flowing through the sample cell 17 than is present in the air-steam mixture flowing through the reference cell 36. A different amount of infrared energy, proportional to the difference in concentration of water vapor in the sample cell 17 and reference cell 36, will be absorbed in these cells and different amounts of energy will reach the chambers 42' and 42" of the detector 42 and will momentarily raise the pressure in these chambers a different amount each time the infrared beam is flashed through the cells 17 and 36 by the rotating beam chopper 41.

A small hole in the diaphragm 43 equalizes gradual pressure differences between the chambers 42' and 42" but does not prevent diaphragm movement in response to the pressure pulses. The diaphragm 43 will move in response to this momentary unbalance in the pressure. A radio-frequency voltage is impressed across the diaphragm 43 and is modulated by the diaphragm in proportion to the degree of variation of pressures in the chambers 42' and 42". This produces an electrical signal which is in proportion to the degree of variation in water vapor content between the stack gas and the air-steam mixture.

Any variance between the moisture content of the stack gas and the air-steam mixture is reflected back to the steam control valve 28 as is diagrammatically indicated by the conductor 44 in Figure 1, and causes an adjustment, by suitable control means of known type, of the setting of valve 28 such that the variance in moisture content of the stack gas sample and air-steam mixture is reduced to zero. The rate of flow of steam required to effect this reduction in variance to zero is measured by the meter 32, and this rate of flow is divided in a mathematical sense in the divider 45 by the rate of flow of the air-steam mixture as measured by the meter 34. The resulting quotient represents the ratio of the amount of moisture in the stack gases that comes from sources other than the ambient air to the total amount of moisture in the stack gases. The connections between meters 32 and 34 and the divider 45 are indicated diagrammatically by conductors 46 and 47 respectively, and it will be understood that divider 45 and other calculating or computer devices referred to herein, and the connections thereto and therebetween, may be of any suitable and readily available type.

The total quantity of moist stack gases which move up through the stack 6 are measured by a meter 48. This quantity is transmitted to a multiplier 49, as indicated by conductor 50, where it is multiplied by the ratio of the rate of flow of steam to the rate of flow of the air-steam mixture as determined by the divider 45. This ratio represents the proportion of the total moisture in the stack gases that has been driven out of the mix, and when the total quantity of stack gases is multiplied by this ratio a value representative of the moisture in the mix is obtained. Conductor 51 indicates the connection between divider 45 and multiplier 49.

The sinter mix supplied to the apparatus is weighed continuously, as by a conventional belt scale indicated at 52, and the weight rate is transmitted to a second divider 53 where it is divided into the result produced by the multiplier 49. The quotient is then transmitted by conductor 53' to the master controller unit 54. This quotient signal is compared in the master controller 54 with a set-point value, selected by the operator and indicated at P on the dial 55, and, in conjunction with the weight rate determined by the scale 52, passes to and operates a water valve 56 which controls the supply of water from a supply pipe 57 to a mixer unit 58.

When the operator selects the desired moisture content (which, for example, may be expressed as percent of water by weight in the sinter mix) and sets the set-point P at this value, the selected moisture content will be automatically and continuously maintained in the mix that is delivered to the sintering machine. It will be understood that when the term "continuously" is used in this specification and the appended claims in describing certain steps of the method or elements of the apparatus, it is intended to include such rapidly repeated measurements or computations as may be necessary or desirable to facilitate digital computations.

The apparatus illustrated in Figure 1 for determining and measuring the portion of the total moisture in the stack gases that comes from the material mix, which value is fed to the multiplier 49 to obtain a value representative of the total mix-moisture in the stack gases, is particularly accurate and will achieve excellent results. However, acceptable results may be obtained by other means for measuring or comparing the total moisture in the stack gases with the moisture in the ambient air in order to create a signal which varies when the mix-moisture in the stack gases increases or decreases relative to the ambient air moisture in the stack gases.

For example, the moisture comparator M, which is diagrammatically illustrated in Figure 2, may be employed to directly and continuously compare the moisture content in a stack gas sample and a simultaneously collected ambient air sample. Thus, referring to Figure 1, by omitting the entire steam supply system 27, 28, 29, 30, 31 and 32, together with the mixer 26, meter 34, divider 45 and connections 46 and 47 therebetween, and directly connecting the ambient air from the constant temperature heater 24 to the tube 35 leading to reference cell 36 of the comparator M, the output of comparator M will represent the difference between the moisture content of the stack gas and the moisture content of the ambient air and will thus vary in accordance with differences in the mix-moisture content of the stack gases. With the modified apparatus referred to, the divider 45 is eliminated and, by connecting the conductor 44 to the conductor 51 leading to the multiplier 49, the output of the comparator M is applied to the multiplier, and from this point the operation and arrangement of the remainder of the apparatus is the same as shown in Figure 1.

A measure of the moisture in the stack gases that arises from, or has its source in, the material mix supplied to the sinter bed may also be obtained, for feeding to the multiplier 49 of Figure 1, by separately and continuously measuring the moisture content of the stack gas sample and the ambient air sample in separate moisture measuring devices such as hygrometers or, as explained later, moisture comparators of the type shown in Figure 2. If the moisture content of the stack gases is continuously determined by a hygrometer of suitable and known type and, by means of a second hygrometer of a similar type, the moisture content of the ambient air sample is obtained, the latter subtracted from the former, the result will be a value representative of the mix-moisture content of the stack gases. This value may be fed to the multiplier 49, and the output thereof utilized in the same manner as described in connection with the apparatus of Figure 1.

In place of a hygrometer for measuring the moisture in the stack gas and the ambient air, a pair of independent comparator units of the type shown in Figure 2 may be employed. When such an instrument is used to give a direct measurement of moisture content of a gas supplied thereto, the sample to be measured is passed through the sample cell 17 while a standard gas is passed through the reference cell 36. Such a standard gas is prepared externally of the apparatus and could be, for example, nitrogen containing exactly 1% moisture. With such an arrangement the output of the detector will be a direct measurement of the percent of moisture in the gas supplied to the sample cell 17. Thus, by using one such unit to measure the percent moisture in the stack gas and another similar but entirely separate such unit to measure the moisture content of the ambient air, and by subtracting the latter value from the former, a value representing the percent of other than ambient air moisture in the stack gases is obtained. When such a value is fed to the multiplier 49 of Figure 1, the output thereof will represent the total mix-moisture in the stack gases and may be employed in the rest of my procedure and apparatus in the manner previously described in referring to Figure 1.

It will be understood from the above description that my moisture determining and control procedure is entirely independent of the physical and chemical make-up of the mix and that, by continuously determining the total quantity of moisture removed from the mix during the sintering operation, and upon any change in this quantity immediately and automatically increasing or reducing the amount of water supplied to the mix to bring the quantity removed back to the desired value, an extremely effective automatic moisture control is obtained which maintains a substantially constant moisture content in the sinter mix regardless of variations in the moisture content of the mix ahead of the moisture addition point.

Although I have described in considerable detail certain procedures and several forms of apparatus for carrying out such procedures, it will be understood that variations and modifications may be made in my improved method and apparatus without departing from the spirit of my invention. I do not, therefore, wish to be limited to the exact procedures and devices herein illustrated and described but claim as my invention all embodiments thereof coming within the scope of the appended claims.

I claim:

1. The method of determining the amount of moisture in a mixed fed to sintering machines and the like which includes the steps of adding steam to a continuously withdrawn sample of ambient air to form an air-steam mixture, said steam being added in quantity sufficient to make the moisture content of said air-steam mixture equal to that of a simultaneously withdrawn sample of the stack gases from the sintering machine, continuously measuring the rate of flow of said steam and the rate of flow of said air-steam mixture and determining the ratio therebetween, said ratio varying when the amount of moisture in the stack gases that comes from sources other than the air supplied to the sinter bed varies, continuously measuring the rate of flow of the stack gases, applying said ratio to said rate of flow of the stack gases to obtain a varying indication of the quantity of other than ambient air moisture in the stack gases, continuously measuring the rate of feed of the mix, and dividing said quantity of other than ambient air moisture by said rate of feed of the mix whereby a continuous indication of the moisture content of the mix as supplied to the sintering machine is obtained.

2. The method of determining the amount of moisture in a mix fed to sintering machines and the like which includes the steps of adding steam to a continuously withdrawn sample of ambient air to form an air-steam mixture, said steam being added in quantity sufficient to make the moisture content of said air-steam mixture equal to that of the stack gases from the sintering machine, continuously measuring the rate of flow of said steam and the rate of flow of said air-steam mixture and dividing the former by the latter whereby a ratio is obtained that varies with the amount of moisture in the stack gases that comes from sources other than the air supplied to the sinter bed, multiplying said ratio by the rate of flow of the stack gases to obtain a varying indication of the quantity of other than ambient air moisture in the stack gases, continuously measuring the rate of feed of the mix, and dividing said quantity of other than ambient air moisture by said rate of feed of the mix whereby a continuous indication of the percent of moisture in the mix as supplied to the sintering machine is obtained.

3. The method of controlling the amount of moisture in a mix fed to sintering machines and the like which includes the steps of adding steam to a continuously withdrawn sample of ambient air to form an air-steam mixture, said steam being added in quantity sufficient to make the moisture content of said air-steam mixture equal to that of a simultaneously withdrawn sample of the stack gases from the sintering machine, continuously measuring the rate of flow of said steam and the rate of flow of said air-steam mixture and determining the ratio therebetween, said ratio varying when the amount of moisture in the stack gases that comes from sources other than the air supplied to the sinter bed varies, continuously measuring the rate of flow of the stack gases, applying said ratio to said rate of flow of the stack gases to obtain a varying indication of the quantity of other than ambient air moisture in the stack gases, continuously measuring the rate of feed of the mix, dividing said quantity of other than ambient air moisture by said rate of feed of the mix whereby a continuous indication of the moisture content of the mix as supplied to the sintering machine is obtained, adding water to the mix before it reaches the point where said rate of feed of the mix is measured, and varying the amount of said water added to the mix inversely as said percentage of moisture in the mix varies whereby a substantially constant moisture content is maintained in the mix.

4. The method of controlling the amount of moisture in a mix fed to sintering machines and the like which includes the steps of adding steam to a continuously withdrawn sample of ambient air to form an air-steam mixture, said steam being added in quantity sufficient to make the moisture content of said air-steam mixture equal to that of the stack gases from the sintering machine, continuously measuring the rate of flow of said steam and the rate of flow of said air-steam mixture and dividing the former by the latter whereby a ratio is obtained that varies with the amount of moisture in the stack gases that comes from sources other than the air supplied to the sinter bed, multiplying said ratio by the rate of flow of the stack gases to obtain a varying indication of the quantity of other than ambient air moisture in the stack gases, continuously measuring the rate of feed of the mix, dividing said quantity of other than ambient air moisture by said rate of feed of the mix whereby a continuous indication of the percent of moisture in the mix supplied to the sintering machine is obtained, adding water to the mix before it reaches the point where said rate of feed of the mix is measured, and varying the amount of said water added to the mix inversely as said percentage of moisture in the mix varies whereby a substantially constant moisture content is maintained in the mix.

5. The method of determining the amount of moisture in a mix fed to sintering machines and the like which includes the steps of continuously determining the quantity of moisture required to be mixed with a continuously withdrawn sample of the ambient air to bring the moisture content of the ambient air sample up to the moisture content of a continuously withdrawn sample of the stack gases from the sintering machine, said quantity representing a measure of the amount of moisture in the stack gases coming from sources other than the ambient air, continuously weighing the mix supplied to the sintering machine, and determining the total moisture in said mix from the weight rate so determined and the said quantity of moisture in the stack gases from sources other than the ambient air.

6. The method of controlling the amount of moisture in a mix fed to sintering machines and the like which includes the steps of continuously determining the quantity of moisture required to be mixed with a continuously withdrawn sample of the ambient air to bring the moisture content of the ambient air sample up to the moisture content of a continuously withdrawn sample of the stack gases from the sintering machine, said quantity representing a measure of the amount of moisture in the stack gases coming from sources other than the ambient air, continuously weighing the mix supplied to the sintering machine, determining the total moisture in said mix from the weight rate so determined and the said quantity of moisture in the stack gases from sources other than the ambient air, continuously comparing said so-determined value of moisture content in the mix with a pre-selected set-point value, and adding water to the mix ahead of the weighing point to bring the moisture content of the mix at said weighing point to, and maintain it at, said set-point.

7. Apparatus for automatically measuring the moisture content of a material mix supplied to sintering machines and the like including, means for continuously withdrawing a sample of stack gases from the sintering machine, means for continuously withdrawing a sample of ambient air from adjacent the sintering machine, a source of supply of steam, mixer means for mixing steam from said source with said withdrawn ambient air sample to form an air-steam mixture, a moisture comparator, connections conducting said withdrawn stack gas sample and said air-steam mixture to said moisture comparator, variations between the moisture content of said stack gas sample and said moisture content of said air-steam mixture being adapted to vary the output signal of said moisture comparator, steam valve means for controlling the flow of steam from said source to said mixer means, valve operating means responsive to variations in the output signal from said moisture comparator for opening or closing said steam valve means whereby the moisture contents of said stack gas sample and said air-steam mixture are maintained substantially equal, means for measuring the quantity of steam required to maintain said moisture contents equal, means for measuring the quantity of stack gases from said sintering machine, calculator means for determining a measure of the quantity of moisture in said stack gases that originated from sources other than the ambient air, means for continuously measuring the quantity of material mix supplied to the sintering machine, and means for continuously dividing said quantity of moisture from other than ambient air by said quantity of material mix supplied to obtain a continuous value indicating the moisture content of the material mix supplied to the sintering machine or the like.

8. Apparatus for automatically measuring and controlling moisture in the sinter mix supplied to a sintering machine having a moving sinter bed, means for moving air through said sinter bed, and stack means for withdrawing gases that pass through said sinter bed, including means for withdrawing a sample of the stack gases, a constant temperature heater for heating said gas sample to a predetermined temperature, means for collecting an ambient air sample, a constant temperature heater for heating said ambient air sample to said predetermined temperature, a source of supply of steam, a constant temperature heater for heating steam from said source to said predetermined temperature, a steam control valve for controlling the flow of steam from said source, a steam flow meter adapted to measure the flow of steam passing through said steam control valve, mixer means downstream from said steam flow meter for mixing the steam from said constant temperature steam heater with the ambient air from said constant temperature air heater, an air-steam mixture flow meter connected to said mixer for measuring the flow of said air-steam mixture, a first divider means connected to receive readings from said steam flow meter and said air-steam flow meter and divide the former by the latter, moisture comparator means connected to receive said constant temperature gas sample and said constant temperature air-steam mixture and adapted to determine the variation in moisture content therebetween, actuating means for said steam control valve responsive to said variation in moisture content between said gas sample and air-steam mixture whereby said steam valve is operated to vary the quantity of steam mixed with said ambient air sample and maintain the moisture content of said air-steam mixture substantially equal to that of said gas sample, means for measuring the quantity of stack gases withdrawn from said sinter bed, multiplier means for multiplying said quantity of stack gases by the quotient from said first divider means, a second divider means, means for measuring the weight rate of sinter mix supplied to said sinter bed, said second divider means being connected to receive the outputs of said multiplier means and said scale means and divide the former by the latter, a controller adapted to compare the output of said second divider means to an adjustable set-point, a water supply line adapted to add water to said mix ahead of said scale means, a water control valve in said supply line, and operating means for said water control valve connected to said master controller, said master controller being also connected to said scale means and adapted to control said water valve whereby the rate of flow of water added to said sinter mix is automatically set at the proper value to maintain the water content in said sinter mix substantially at said set-point.

9. The method of maintaining a substanially constant moisture content in the mix supplied to sintering machines nad the like, said sintering machine having mix heating apparatus and a stack through which gases from said mix heating apparatus are discharged, which includes continuously determining the amount of moisture removed from the mix during the sintering operation by continuously withdrawing a sample of the stack gas and measuring the amount of moisture added to the stack gases as a result of the sintering operation, adding water to the mix ahead of said mix heating apparatus, and automatically varying the amount of water so added to the mix in accordance with variations in the amount of moisture removed from the mix, the amount of water added being reduced when the quantity of moisture removed from the mix increases and being increased when the amount of moisture removed from the mix decreases.

10. Apparatus for automatically measuring the moisture content of a material mix supplied to sintering machines and the like including, means for continuously withdrawing a sample of stack gases from the sintering machine, means for continuously withdrawing a sample of ambient air from adjacent the sintering machine, means for determining a measure of the quantity of moisture in said stack gases that originated from sources other than the ambient air, means for continuously measuring the quantity of mix supplied to the sintering machine, and means for continuously dividing said quantity of moisture from sources other than the ambient air by the quantity of material mix supplied to obtain a continuous value indicating the moisture content of the material mix supplied to the sintering machine or the like.

11. Apparatus for automatically measuring the moisture content of a material mix supplied to sintering machines and the like including, means for continuously withdrawing a sample of stack gases from the sintering machine, means for continuously withdrawing a sample of ambient air from adjacent the sintering machine, means for determining a measure of the quantity of moisture in said stack gases that originated from sources other than the ambient air, means for continuously measuring the quantity of mix supplied to the sintering machine, means for continuously dividing said quantity of moisture from sources other than the ambient air by the quantity of material mix supplied to obtain a continuous value indicating the moisture content of the material mix supplied to a sintering machine or the like, controller means adapted to compare said value of the moisture content of the material mix to an adjustable set point, means for supplying water to said mix ahead of said means for continuously measuring the quantity of mix, controller means responsive to said value of the moisture content of the material mix, and means controlled by said controller means for varying the amount of water supplied to said mix whereby the moisture content in said material mix is maintained substantially at a predetermined value.

12. The method of determining the amount of moisture in a mix fed to sintering machines and the like which includes the steps of continuously heating said mix to drive out all moisture therefrom, conducting the moisture so driven out to a stack, continuously determining the ratio of the moisture in the stack gases from the sintering machine that comes from sources other than the ambient air to the total moisture in said stack gases, continuously measuring the rate of flow of the stack gases, continuously multiplying said rate by said ratio whereby a value is obtained that represents the quantity of moisture other than ambient air moisture in the stack gases, continuously measuring the quantity of mix supplied to the sintering machine, and continuously determining, from said quantity of moisture other than ambient air moisture in the stack gases and said quantity of mix, a value representing the proportion of moisture in the mix.

13. The method of regulating the amount of moisture in a mix fed to sintering machines and the like which includes the steps of continuously heating said mix to drive out all moisture therefrom, continuously determining the ratio of the moisture in the stack gases from the sintering machine that comes from sources other than the ambient air to the total moisture in said stack gases, continuously measuring the rate of flow of the stack gases, continuously multiplying said rate by said ratio whereby a value is obtained that represents the quantity of moisture other than ambient air moisture in the stack gases, continuously measuring the quantity of mix supplied to the sintering machine, continuously determining, from said quantity of moisture other than ambient air moisture in the stack gases and said quantity of mix, a value representing the proportion of moisture in the mix, continuously comparing said value representing the moisture in the mix with a preselected set-point value, and adding water to the mix ahead of the place at which said quantity of mix is measured to bring the moisture contained in the mix at said place to, and maintain it at, said set-point.

References Cited in the file of this patent

UNITED STATES PATENTS

| | | |
|---|---|---|
| 2,676,095 | De Vaney et al. | Apr. 20, 1954 |
| 2,739,800 | Sisco | Mar. 27, 1956 |
| 2,866,690 | Coyne | Dec. 30, 1958 |

FOREIGN PATENTS

| | | |
|---|---|---|
| 647,429 | Germany | July 3, 1937 |

Notice of Adverse Decision in Interference

In Interference No. 91,411 involving Patent No. 2,931,718, M. J. Greaves, Method and apparatus for automatically measuring and controlling moisture in a sinter mix or the like, final judgment adverse to the patentee was rendered May 4, 1961, as to claims 5, 6, 9, 10, 11, 12, and 13.

[*Official Gazette June 6, 1961.*]